United States Patent [19]

Day

[11] 4,135,923

[45] Jan. 23, 1979

[54] EXTRACTION OF METALS

[75] Inventor: Joseph G. Day, Holmer Green, England

[73] Assignee: Johnson, Matthey & Co., Limited, London, England

[21] Appl. No.: 854,427

[22] Filed: Nov. 23, 1977

[30] Foreign Application Priority Data

Nov. 23, 1976 [GB] United Kingdom ............... 48786/76

[51] Int. Cl.$^2$ ................................................ C22C 9/00
[52] U.S. Cl. .......................................... 75/153; 75/23; 75/24; 75/72; 75/83; 75/118 R; 75/172 G; 75/173 C; 75/165
[58] Field of Search ................. 75/83, 23, 72, 24, 153, 75/165, 173 C, 172, 118

[56] References Cited

U.S. PATENT DOCUMENTS 722,809   3/1903   Carpenter ................................. 75/83
1,896,807  2/1933   Bauer ......................................... 75/83

Primary Examiner—M. J. Andrews
Attorney, Agent, or Firm—Cushman, Darby & Cushman

[57] ABSTRACT

This invention relates to the extraction of metals. More particularly, the invention is concerned with the extraction of one or more precious metals from material containing such metals. By "precious metals", both here and throughout the remainder of this specification, meant gold, silver and the platinum group metals, platinum, palladium, rhodium, ruthenium, iridium and osmium. In particular the invention relates to a process for the extraction of precious metal from a material containing a precious metal selected from the group consisting of gold, silver, platinum, rhodium, ruthenium, iridium and osmium and including heating a mixture comprising the said material, copper sulphide or at least one precursor thereof and a flux.

4 Claims, No Drawings

EXTRACTION OF METALS

This invention relates to the extraction of metals. More particularly, the invention is concerned with the extraction of one or more precious metals from material containing such metals. By "precious metals", both here and throughout the remainder of this specification, is meant gold, silver and the platinum group metals, platinum, palladium, rhodium, ruthenium, iridium and osmium. Further, "precious metal" means one or more of these precious metals as the context requires.

The invention is especially well adapted to the extraction of precious metal from precious metal "residues" and "sweeps" but it is by no means so limited.

By "precious metal residues" is meant material, containing at least one precious metal, which remains after the completion of some chemical or metallurgical process. Typical of such residues are the residues left after the smelting zinc and the firing of photographic film.

By "precious metal sweeps" is meant material, containing at least one precious metal, which is produced when precious metal bodies or bodies made of precious metal-containing alloy are subjected to some mechanical process such as filing, sawing, turning or milling. In such cases the "sweeps" may comprise metal filings or swarf or both, and the name is derived from the fact that "sweeps" are recovered by being swept up from the benches and floor of the workshop or factory etc. where they are formed. Sweeps may also, of course, contain non-precious metals and other materials used in the workshop or factory.

A known way of recovering silver from precious metal sweeps in which the precious metal is predominantly silver comprises mixing the sweeps with lead, generally in the form of litharge, coke and a flux comprising lime, iron oxide and silica, and then firing the mixture in a blast furnace. This leads to the formation of a lead-silver alloy which may be withdrawn from the base of the furnace. Thereafter, the silver is recovered by oxidising the molten alloy in a suitable vessel and skimming off the lead oxide which forms as a scum on the surface of the molten alloy.

The use of lead in this process is objectionable because it constitutes a health hazard to, among others, those operating the process. It is accordingly one object of the present invention to provide a method for the extraction of silver from silver-containing materials which is not subject to this objection. The main object of the invention, however, is to provide an effective, relatively simple and non-hazardous process for the extraction of precious metal from precious metal-containing material.

According to a first aspect of the invention a process for the extraction of precious metal from precious metal-containing material involves heating a mixture comprising the said material, copper sulphide or a precursor or precursors thereof and a flux.

According to further aspects of the invention:
(a) the said mixture is heated:
   (i) in a reverbaratory furnace or
   (ii) in a gas fired crucible or
   (iii) by induction heating or
   (iv) together with coke in a blast furnace,
to a temperature within the range 1100° to 1300° C.;
(b) the said mixture includes:
   (i) cuprous sulphide and/or
   (ii) copper sulphate and coke and/or
   (iii) copper and sulphur and/or some sulphur-rich material such as iron pyrites;
(c) the said flux comprises:
   (i) a lime, iron oxide and silica flux and/or
   (ii) an alkali metal carbonate and alkali metal chloride flux such as a sodium carbonate and sodium chloride flux.

When a mixture according to the first aspect of the invention is heated as described, most of the precious metal forms an alloy with the copper which alloy may be withdrawn in the molten form from the base of the furnace. In addition, there is formed, above the molten alloy, a copper sulphide-precious metal matte and, above this a slag containing a small quantity of precious metal. Further, if a chloride is present, such as when a sodium chloride-containing flux is used, a volatile double chloride of precious metal and sodium is formed and is vaporised. This is particularly so when the precious metal consists of, or at least, consists predominantly of silver.

According to yet further aspects of the invention, therefore, the process of extracting precious metal from precious metal-containing material includes
(d) recovering precious metal
   (i) from the said alloy,
   (ii) from the said matte,
   (iii) from the said slag, and
   (iv) when appropriate, from the said double chloride after its vapour has been caused to condense.

The recovery of precious metal from any of the materials outlined in (d) may be accomplished by any convenient chemical and/or electrochemical process.

One way in which the invention may be used for the extraction of silver from sweeps containing 240 pbw of silver, 100 pbw of copper, 10 pbw of nickel some gold and platinum group metal is as follows. Quantities in the following which are expressed in "parts" are in parts by weight. 2000 parts of the sweeps are first mixed with 400 parts of slaked lime, 400 parts of iron oxide, 1000 parts of crushed coke, 100 parts of silica and 140 parts of copper as cuprous sulphide, $Cu_2S$. The mixture is then formed into pellets and fed into a blast furnace where it is heated to 1100° C. At the base of the blast furnace an alloy is formed comprising nearly 240 parts of silver, about 230 parts of copper and some nickel.

Above the alloy there is a zone of matte in which for every 10 parts of cuprous sulphide there is 1 part of silver some nickel and some iron and above this, a layer of slag containing about 0.5 wt% of silver.

Silver may be recovered from the alloy by first leaching it with a mixture of sulphuric and nitric acids. Preferably the alloy is atomised beforehand to facilitate the leaching, which process will remove all but about 13 parts of the copper and will leave the silver gold and platinum group metal substantially untouched.

Thereafter the residual alloy is cupelled to remove about two thirds of the copper and finally the alloy is cast into blocks which are used as anodes in an electrolytic bath for the further purification of the silver and the separation therefrom of the gold and platinum group metal.

The matte, and if the silver content makes it worthwhile, the slag, is ground up, roasted to remove the sulphur, leached in sulphuric acid and the metallic product is cupelled. Preferably this cupellation is carried out with the product from the leaching of the alloy so that a single product useable as an anode will be obtained. Preferably, also, the slag is subjected to a mineral dressing step to remove much of the worthless dross before roasting and leaching.

Although the invention has been described with reference to the extraction of silver and minor quantities of other precious metals from sweeps, it is by no means so limited and may be used for the extraction of precious metal from many other precious metal-containing materials.

In an interesting modification of the invention, especially for the treatment of materials containing silver, a flux containing a relatively large quantity of alkali metal chloride may be used. In this way the proportion of precious metal (and especially silver) which is recovered by the volatilisation and subsequent condensation of the double chloride or chlorides of precious metal and alkali metal is increased. Thereafter, of course, the precious metal is recovered from the condensed double chlorides by known chemical means.

In a limiting case of this modification of the invention the precious metal — (and especially silver-) — containing material is added to a fused chloride bath so that the precious metal is recovered predominantly from the double chloride.

What we claim is:

1. A process for the extraction of a precious metal selected from the group consisting of gold, silver, platinum, rhodium, ruthenium, iridium and osmium from a material containing said precious metal, said process including the steps of heating a lead-free mixture consisting essentially of said material; at least one member of the group consisting of (i) cuprous sulphide, (ii) copper sulphate and coke and (iii) copper and iron pyrites; and a flux which is at least one member selected from the group consisting of lime, iron oxide, silica flux, an alkali metal carbonate flux and an alkali metal chloride flux, said mixture being heated to a temperature in the range of 1100°–1300° C. until most of the precious metal forms an alloy with copper and then separating this alloy in the molten state from the remaining material.

2. A process according to claim 1 including the further subsequent step of removing the precious metal from the said alloy.

3. A process according to claim 2 wherein during heating, in addition to said alloy, a copper sulphide-precious metal matte is formed above the said alloy and a slag containing precious metal is formed above the matte, and the process includes the further steps of separately treating the matte and slag to remove precious metal present therein.

4. A process according to claim 1 wherein the flux is selected from the group consisting of sodium carbonate and sodium chloride.

* * * * *

UNITED STATES PATENT AND TRADEMARK OFFICE
CERTIFICATE OF CORRECTION

PATENT NO. : 4,135,923

DATED : January 23, 1979

INVENTOR(S) : Joseph G. Day

It is certified that error appears in the above-identified patent and that said Letters Patent is hereby corrected as shown below:

Column 3, line 27, before "rhodium" insert -palladium,--

Signed and Sealed this

Seventeenth Day of September 1985

[SEAL]

Attest:

DONALD J. QUIGG

Attesting Officer

Commissioner of Patents and
Trademarks—Designate